Oct. 28, 1952 — L. R. LUDWIG ET AL — 2,615,937

FAN-COOLED MOTOR

Original Filed Aug. 15, 1946

WITNESSES:

INVENTORS
Leon R. Ludwig, Theodore C. Fockler,
William H. Formhals and Howard T. Walton.
BY
ATTORNEY Patented Oct. 28, 1952

2,615,937

UNITED STATES PATENT OFFICE 2,615,937

FAN-COOLED MOTOR

Leon R. Ludwig, Pittsburgh, Pa., and Theodore C. Fockler and William H. Formhals, Buffalo, N. Y., and Howard T. Walton, Pittsburgh, Pa., assignors to Westinghouse Electric Corporation. East Pittsburgh, Pa., a corporation of Pennsylvania Original application August 15, 1946, Serial No. 690,628, now Patent No. 2,571,907, dated October 16, 1951. Divided and this application February 28, 1951, Serial No. 213,091

8 Claims. (Cl. 171—252)

This is a division of our application Serial No. 690,628, filed August 15, 1946, now Patent No. 2,571,907, issued October 16, 1951, on splashproof motors.

Our present invention relates to electric motors, and more particularly to a redesigned line of induction motors, which have the advantages of extreme simplicity and economy of construction, a pleasing appearance, a small size, within the standardization-limits established by the industry, and complete convertibility into a maximum number of motor-types with a minimum number of parts.

A principal object of our invention is to provide a novel type of fan-cooled motor, in which each bracket has only an axial register, and not a radial register, with the stator-core, so as to provide a totally enclosed motor-construction, while the necessary radial register, for aligning the bearings carried by the brackets, is provided by an intermittent register with a prepared machined surface on the respective ends of a cylindrical frame-ring. Among other advantages, this form of construction makes possible the use of a core-holding end-plate which is only a quarter of an inch thick, or less, or, in general, thin enough so that it can be punched, as distinguished from a cast or machined job.

Figure 1:
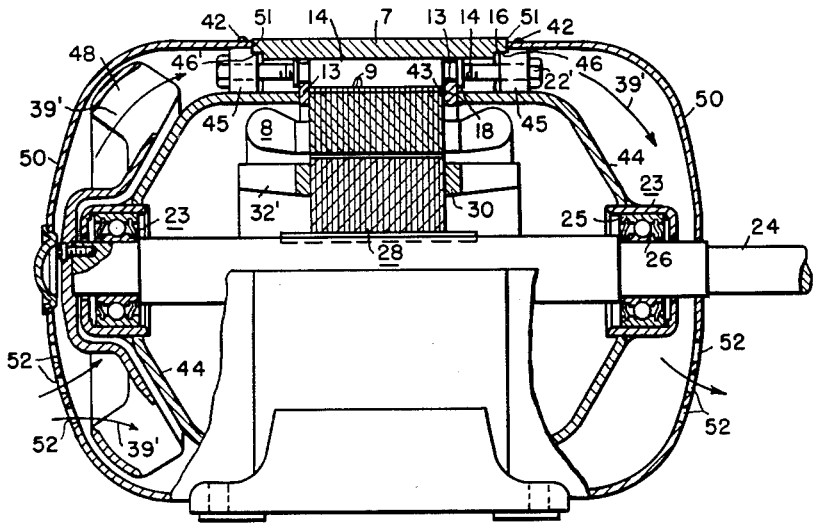
Figure 2:
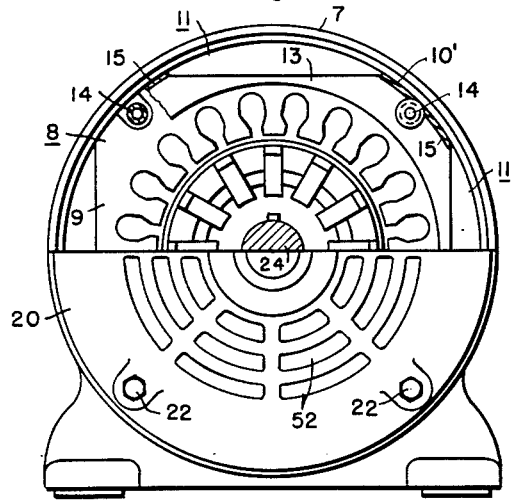

With the foregoing and other objects in view, our invention consists in the structures, combinations, systems, methods and parts, hereinafter described and claimed, and illustrated in the accompanying drawings, wherein:

Fig. 1 is a longitudinal sectional view of a form of embodiment of our invention, to provide a fan-cooled motor, the motor-foot being shown in elevation, and Fig. 2 is an end view of the motor shown in Fig. 1, with the top half of the bracket cut away.

All forms of embodiment of our motor utilize a stator-member comprising a strong, rigid, frame-ring 7 and a stator-core assembly 8. In many cases, it is desirable that the frame-ring 7 shall constitute an imperforate enclosure-ring for the machine. The stator-core assembly 8 comprises a rigidly held stack of stator-laminations 9, which have a tight fit, known as an interference-fit, with the inside of the frame-ring 7, at a plurality of circumferentially-spaced points, as indicated at 10' in Fig. 2. It is preferable that the stator-laminations shall fit tightly enough, in the frame-ring 7, so as to readily conduct heat from the laminations to the frame-ring. At other points around their peripheries, the stator-laminations 9 are spaced from the inside of the frame-ring 7, so as to provide axially extending ventilating-spaces 11, which admit of an axial air-flow over the stator-core laminations 9, preferably, though not necessarily, extending from one end of the core straight through to the other end. The stator-core laminations carry the stator or primary windings 10, the end-turns of which are shown in Fig. 1.

The stack of stator-core laminations 9 may be held together in any desired way, so far as the broader aspects of our invention are concerned. We prefer to use the improved core-holding assembly which constitutes the subject-matter of Patent No. 2,447,645, granted August 24, 1948, to Arthur E. Goodwin and Leon R. Ludwig. It is sufficient to say that the stator-laminations 9 are held between two end-plates 13, which are held tightly compressed against the laminations, by means of a plurality of circumferentially-spaced, elongated, axially disposed lamination-holding members, which are shown as locking-bars 14. The end-plates 13 do not make a tight fit with the inside of the frame-ring 7, but are welded to the inside of the frame-ring, after the core-member is assembled in the ring, at a plurality of circumferentially spaced points, as indicated at 15 in Fig. 2. The remaining peripheral portions of the end-plates are spaced from the inside of the frame-ring 7, to provide the aforementioned axial ventilating spaces 11.

After the stator-frame has been assembled, as above described, two fits are machined on each end of the frame, these four machining operations being advantageously performed simultaneously. One of these fits is in the frame-ring 7, both ends of which are rabbeted, to provide an accurate radial-register surface 16, and an accurate axial-register surface 17. The other fit is on the stator end-plates 13, the exposed end-faces of each of which are machined, to provide an accurate axial-register surface 18, as shown in Fig. 1.

In our fan-cooled machine, as shown in Fig. 1, use is made of the machined, axial-register surfaces 18 on the end-plates 13 of the stator-core assembly. These axial-register surfaces 18 cooperate with axial-register surfaces 43 on the peripheries of two imperforate brackets 44, one on each end of the machine. These imperforate brackets 44 are provided with bearings 23 for supporting the rotor-shaft 24. In the particular motor which is shown in the drawings, the bearings 23 are ball-bearings, in which the stator part 25 of the bearing is permanently assembled with the rotating bearing-part 26 which is fixed to, or carried by, the shaft 24, so that the shaft-mounted bearing-part 26 has to be pressed on or off the shaft, whenever a bracket 20 is applied to, or removed from, the machine, or, if the ball-bearing part 26 is left attached to the shaft, then the stationary bearing-part 25 has to be moved in or out of the bearing housing 23, when the bracket is applied to, or removed from, the machine. At any rate, the two rotating bearing-parts 26, at the two ends of the machine, are at a fixed distance apart, said distance being fixed by the particular shaft 24 which is utilized.

The motor which is shown in Figs. 1 and 2 is completed by a rotor-member which is carried by the motor-shaft 24. The rotor is characterized by a rotor core-member 28, and suitable fan-means for ventilating the machine. In the particular form of motor which is illustrated, a cast squirrel-cage rotor is utilized, having end-rings which are shown at 30, and a plurality of straight, or axially directed, ventilating-vanes 32', projecting axially from each of the end-rings 30.

The outer peripheries of the imperforate brackets 44 make no radial register with the stator-core assembly, but they are provided with a plurality of outwardly extending lugs 45, which are disposed opposite the ends of the locking-bars 14, so that the imperforate brackets may be secured to the respective ends of the stator-member, by means of bolts 22' which pass through the lugs 45 and into the ends of the respective locking-bars 14. The lugs 45 are provided with accurate radial-register surfaces 46, which register with the corresponding radial-register surface 16 of the end of the frame-ring 7, but these lugs have no axial-register with the frame-ring.

It will be noted that the two imperforate brackets 44 of Fig. 1 make a continuous axial-register fit, but no radial-register fit, with the respective ends of the stator-core assembly, while the peripheral lugs 45 on the two imperforate brackets 44 make an intermittent radial-register fit, but no axial-register fit, with the respective ends of the frame-ring 7. The continuous axial-register fits, at the surfaces 18 and 43, provide closed-housing joints between the stator-core and the two imperforate brackets 44. The fact that the brackets 44 are imperforate, or have no ventilating-hole therein, added to the provision of the closed-housing joints 18—42, results in the complete enclosure of the motor, as shown in Fig. 1. The primary end-turns 10 are ventilated by the internally mounted fan-vanes 32' which are inside of the machine. These fan-vanes or blades 32' operate by stirring the air within each of the imperforate brackets 44. They do not produce an axially flowing stream of ventilating-air, because the outer periphery of the stator-core 9 is effectually sealed, at 18—43, at both ends of the stator-core.

In the fan-cooled, totally enclosed machine of Fig. 1, an externally mounted fan-means is provided, in the form of one or more axial-flow fans 48, only one being shown, which is removably mounted on the shaft 24 on the outside of at least one of the bearings 23, for causing air to flow from one end of the machine to the other, this axial air-flow being directed by means of two identical hoods 50, one at each end of the machine. Each hood 50 has a peripheral part having an accurately machined, axial-register surface 51, which registers or fits against the corresponding surface 17 at that end of the frame ring 7, so as to make a substantially continuous fit on that end of the frame-ring. The hoods 50 may be retained in place by any suitable means, such as the set-screws 42. The two hoods 50 are provided with air-vent openings 52 which are preferably disposed somewhere near the bearings 23, so as to constrain the external ventilating-air to pass over the bearings, as shown by the arrows 39'. The air-vents 52 are also preferably on the bottom halves of the hoods 50, for protection against the entry of water and dirt.

In operation, it will be noted that we extract heat from the primary end-windings 10, by internal ventilation, and also use an axially flowing stream of air which passes through the axial ventilating-space 11 between the outer periphery of the stator-laminations 9 and the inside of the frame-ring 7. This axially directed stream, in the fan-cooled design of Fig. 1, is an external stream 39' which also cools the imperforate or total-enclosure brackets 44, which thus cools the internal air trapped within the enclosed machine, while at the same time cooling the frame-ring 7, which is in direct heat-radiating contact with a plurality of spaced points 10' around the circumference of the stator-laminations, in the manner shown in Fig. 2.

While we have shown our invention in forms of embodiment which are at present preferred, we desire it to be understood that our invention is susceptible of a wide variety of application and adaptation. We desire therefore, that our claims shall be accorded the broadest construction consistent with their language.

We claim as our invention:

1. A fan-cooled dynamo-electric machine comprising a strong, rigid frame-ring having an accurate radial-register surface at each end thereof, a stator-core comprising a rigidly held stack of stator-laminations fitting, at a plurality of spaced points about the outer periphery of the stator-laminations, within the inside of the frame-ring, the stator-laminations being spaced from the inside of the frame-ring at other peripheral points, the stator-core having an accurate axial-register surface at each end thereof, a stator-winding carried by the stator-core, two imperforate brackets removably mounted on the frame-ring, one at each end, each imperforate bracket having no ventilating-hole therein and having an accurate peripheral axial-register surface fitting against the corresponding axial-register surface of the stator-core, said imperforate brackets having no radial register with the stator-core but having peripheral lugs having radial-register surfaces having an intermittent radial register with the respective radial-register surfaces of the frame-ring, bearings carried by said imperforate brackets, a rotor-member having a shaft which is supported by said bearings and having internally mounted fan-means for at least ventilating the end-turns of the stator-winding at both ends of the stator-core, said rotor-member further having externally mounted fan-means, removably mounted on the shaft on the outside of at least one of the bearings, for causing a ventilating gas to flow axially within the space between the inside of the frame-ring and the periphery of the stator-laminations, and two hoods, each having a ventilating-hole and having a peripheral part which makes a substantially continuous fit at its end of the frame-ring.

2. A fan-cooled dynamo-electric machine comprising a solid frame-ring, a stator-core member supported by said frame-ring, said stator-core engaging the frame-ring at spaced points about its periphery, with radial spaces between other portions of the outer periphery of the stator-core and the frame-ring, thus defining an axially extending ventilating-space which admits of an axial air-flow over the stator-core from one end of the core to the other, a shaft, a rotor-core member carried by the shaft, two imperforate brackets removably mounted on the frame-ring, one at each end, said brackets engaging the frame-ring at circumferentially spaced points, each imperforate bracket having no air-hole therein, and having a bearing for supporting the shaft at that end of the machine, and further having a peripheral part having a continuous axial register with its end of the stator-core member, axial-flow fan-means, removably mounted on the shaft on the outside of at least one of the bearings, for causing air to flow from one end of the machine to the other, and two hoods each having a centrally disposed air-hole and a peripheral part which makes a continuous fit on its end of the frame-ring.

3. A fan-cooled dynamo-electric machine comprising a solid frame-ring, a stator-core member supported by said frame-ring, said stator-core engaging the frame-ring at spaced points about its periphery, with radial spaces between other portions of the outer periphery of the stator-core and the frame-ring, thus defining an axially extending ventilating-space which admits of an axial air-flow over the stator-core from one end of the core to the other, a shaft, a rotor-core member carried by the shaft, two imperforate brackets removably mounted on the fame-ring, one at each end, each imperforate bracket having no air-hole therein, and having a bearing for supporting the shaft at that end of the machine, and further having a peripheral part having a continuous axial register but no radial register with its end of the stator-core member, and further having an intermittent radial register with its end of the frame-ring, axial-flow fan-means, removably mounted on the shaft on the outside of at least one of the bearings, for causing air to flow from one end of the machine to the other, and two hoods each having a centrally disposed air-hole and a peripheral part which makes a continuous fit on its end of the frame-ring.

4. A fan-cooled dynamo-electric machine comprising a solid frame-ring, an end-plate secured within the inner periphery of the frame-ring near each end of the frame-ring, a stator-core member secured between the two end-plates, said stator-core engaging the frame-ring at spaced points about its periphery and the intervening portions of the outer periphery of the stator-core being radially spaced from the inner periphery of the frame-ring, the end-plates having air-vents therethrough, admitting of an axial air-flow over the stator-core from one end of the core to the other, a shaft, a rotor-core member carried by the shaft, two imperforate brackets removably mounted on the frame-ring, one at each end, each imperforate bracket having no air-hole therein, and having a bearing for supporting the shaft at that end of the machine, and further having a peripheral part having a continuous axial register but no radial register with its end-plate, and further having an intermittent radial register with its end of the frame-ring, axial-flow fan-means, removably mounted on the shaft on the outside of at least one of the bearings, for causing air to flow from one end of the machine to the other, and two hoods each having a centrally disposed air-hole and a peripheral part which makes a continuous fit on its end of the frame-ring.

5. A totally enclosed dynamo-electric machine comprising a strong, rigid solid frame-ring having an accurate radial-register surface at each end thereof, a stator-core comprising a rigidly held stack of stator-laminations fitting, at a plurality of spaced points about the outer periphery of the stator-laminations, within the inside of the frame-ring, the stator-laminations being spaced from the inside of the frame-ring at other peripheral points, the stator-core having an accurate axial-register surface at each end thereof, a stator-winding carried by the stator-core, two imperforate brackets removably mounted on the frame-ring, one at each end, each imperforate bracket having no ventilating-hole therein and having an accurate peripheral axial-register surface fitting against the corresponding axial-register surface of the stator-core, said imperforate brackets having no radial register with the stator-core but having peripheral lugs having radial-register surfaces having an intermittent radial register with the respective radial-register surfaces of the frame-ring, bearings carried by said imperforate brackets, and a rotor-member having a shaft which is supported by said bearings and having internally mounted fan-means for at least ventilating the end-turns of the stator-winding at both ends of the stator core.

6. A totally enclosed dynamo-electric machine comprising a solid frame-ring, a stator-core member supported by said frame-ring, said stator-core engaging the frame-ring at spaced points about its periphery with radial spaces between the intervening portions of the outer periphery of the stator-core and the frame-ring, a shaft, a rotor-core member carried by the shaft, and two imperforate brackets removably mounted on the frame-ring, one at each end, said brackets engaging the frame-ring at circumferentially spaced points, each imperforate bracket having no air-hole therein, and having a bearing for supporting the shaft at that end of the machine, and further having a peripheral part having a continuous axial register with its end of the stator-core member.

7. A totally enclosed dynamo-electric machine comprising a solid frame-ring, a stator-core member supported by said frame-ring, said stator-core engaging the frame-ring at spaced points about its periphery with radial spaces between the intervening portions of the outer periphery of the stator-core and the frame-ring, a shaft, a rotor-core member carried by the shaft, and two imperforate brackets removably mounted on the frame-ring, one at each end, each imperforate bracket having no air-hole therein, and having a bearing for supporting the shaft at that end of the machine, and further having a peripheral part having a continuous axial register but no radial register with its end of the stator-core member, and further having an intermittent radial register with its end of the frame-ring.

8. A totally enclosed dynamo-electric machine comprising a solid frame-ring, an end-plate secured within the inner periphery of the frame-ring near each end of the frame-ring, a stator-core member secured between the two end-plates, said stator-core engaging the frame-ring at spaced points about its periphery and the intervening portions of the outer periphery of the stator-core being radially spaced from the inner periphery of the frame-ring, a shaft, a rotor-core member carried by the shaft, and two imperforate brackets removably mounted on the frame-ring, one at each end, each imperforate bracket having no air-hole therein, and having a bearing for supporting the shaft at that end of the machine, and further having a peripheral part having a continuous axial register but no radial register with its end-plate, and further having an intermittent radial register with its end of the frame-ring.

LEON R. LUDWIG.
THEODORE C. FOCKLER.
WILLIAM H. FORMHALS.
HOWARD T. WALTON.

REFERENCES CITED

The following references are of record in the file of this patent:

UNITED STATES PATENTS

| Number | Name | Date |
|---|---|---|
| 1,969,493 | Ansingh | Aug. 7, 1934 |
| 2,002,910 | Mendenhall | May 28, 1935 |

FOREIGN PATENTS

| Number | Country | Date |
|---|---|---|
| 122,927 | Australia | Oct. 26, 1945 |